United States Patent [19]

Dudley et al.

[11] 4,310,417
[45] Jan. 12, 1982

[54] AIR INLET MATERIAL SEPARATOR FOR CHIP CENTRIFUGE

[75] Inventors: Robert H. Dudley, Portage; Larry D. Areaux, Texas Township, Kalamazoo County; Russell D. Dudley, Vicksburg, all of Mich.

[73] Assignee: Reclamet, Inc., Kalamazoo, Mich.

[21] Appl. No.: 62,502

[22] Filed: Jul. 31, 1979

[51] Int. Cl.³ .............................................. B01D 33/10
[52] U.S. Cl. ..................................................... 210/375
[58] Field of Search .............. 210/298, 375, 360, 380, 210/374, 304, 408, 409, 410, 523, 524; 209/139 R, 145, 137; 233/28, 45

[56] References Cited

U.S. PATENT DOCUMENTS

| | | | |
|---|---|---|---|
| 2,000,181 | 5/1935 | Lessing et al. | 209/139 R |
| 2,203,821 | 6/1940 | Hinchman | 209/139 R |
| 2,203,959 | 6/1940 | Hammock | 209/149 |
| 2,585,301 | 2/1952 | Doss | 209/137 |
| 3,400,814 | 9/1968 | Hobbs | 209/149 |
| 3,441,131 | 4/1969 | Gebauer | 209/139 R |
| 3,630,353 | 12/1971 | Seldel et al. | 209/139 R |
| 3,850,814 | 11/1974 | Dudley | 210/298 |
| 4,082,675 | 4/1978 | Hedmann | 210/360 |
| 4,137,176 | 1/1979 | Dudley et al. | 210/375 |
| 4,186,097 | 1/1980 | Dudley et al. | 210/380 |

*Primary Examiner*—Theodore A. Granger
*Attorney, Agent, or Firm*—Blanchard, Flynn, Thiel, Boutell & Tanis

[57] ABSTRACT

In a device for separating a liquid, as a cutting oil, from a mixture of metal chips and larger pieces of metal, such as bar ends and scrap, there is provided structure for preliminarily separating larger pieces of metal from the entire mass prior to the separation of the oil from the chips. A centrifuge is provided having a drum with an intermediate perforated segment to permit the escape of oil therefrom while the chips move to the upper edge of the drum and thence outwardly to a receiving structure. A chute is provided for feeding the mixture to be separated into the central portion of the drum and a strong stream of air is caused to flow therethrough into the centrifuge. An opening is provided in the bottom of the chute intermediate its ends. Thus, bar ends, and other large pieces of metal which may be included in said mixture, will drop through the opening while air being drawn into the chute through the opening by the centrifuge will entrain the metal chips to prevent their dropping out of the opening and continue onward through the chute into the centrifuge.

23 Claims, 10 Drawing Figures

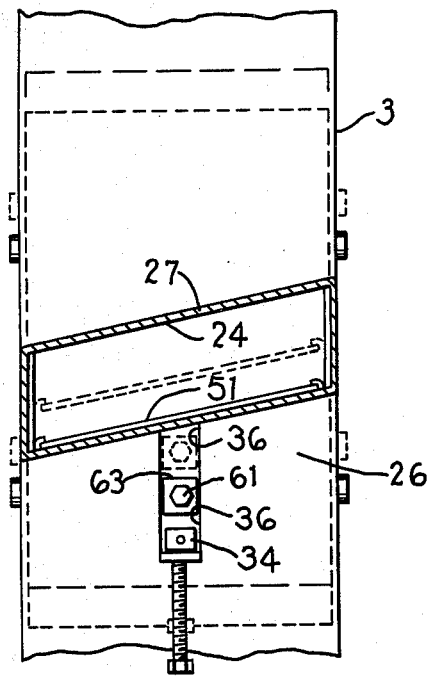
FIG. 3
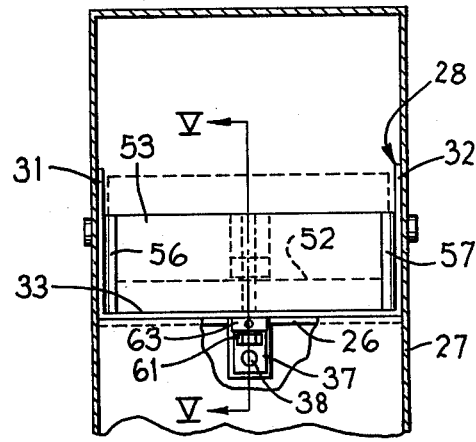
FIG. 4
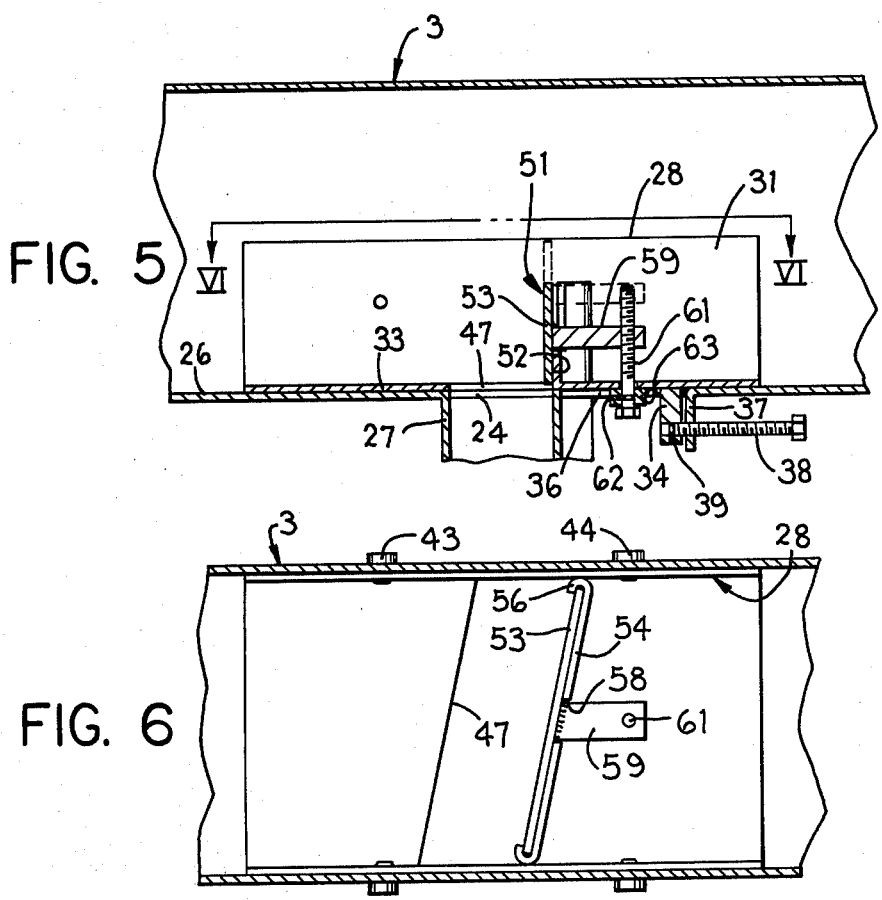
FIG. 5
FIG. 6

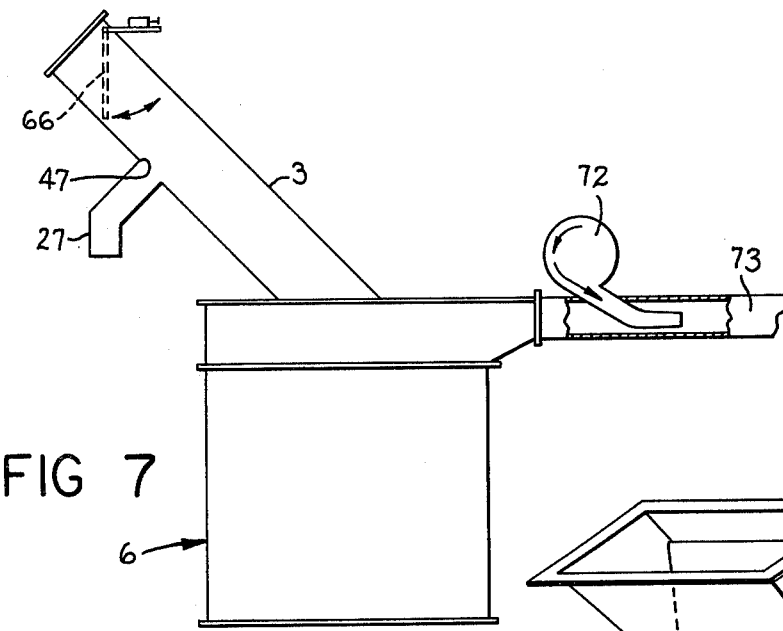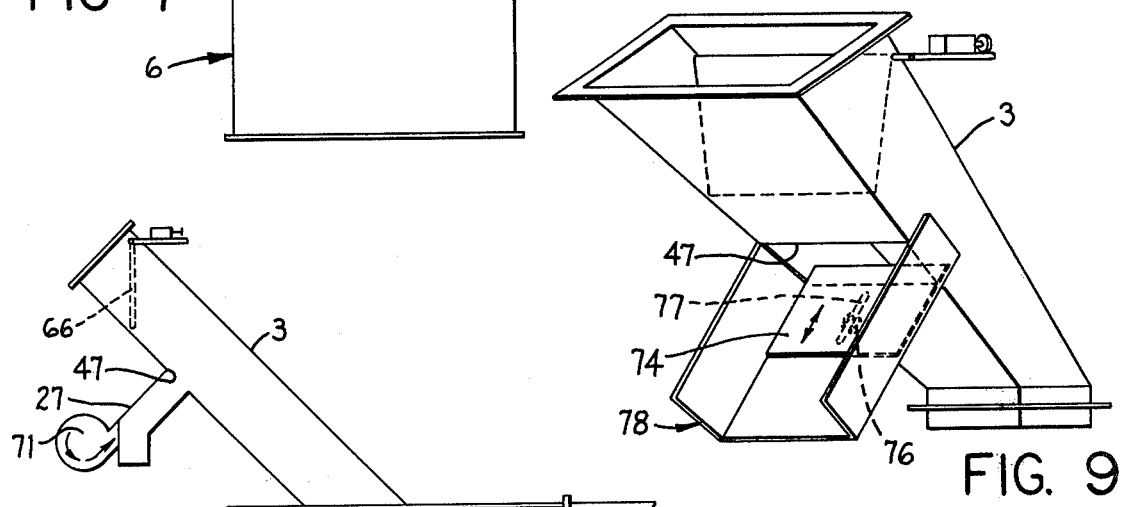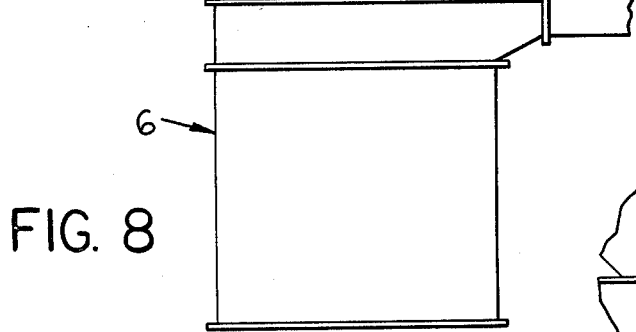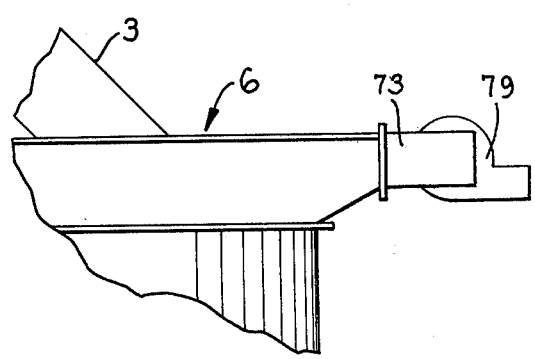

AIR INLET MATERIAL SEPARATOR FOR CHIP CENTRIFUGE

FIELD OF THE INVENTION

The invention relates to feeding means for a separator and particularly to means for separating the undesirable components of the solid scrap, such as bar ends and piece parts, from a mixture of such larger pieces, chips and a liquid, as a cutting fluid, prior to the feeding of the remaining mixture of chips and fluid to separator means for separating said fluid from said chips.

BACKGROUND OF THE INVENTION

Separator means, particularly centrifugal separator means, are already known for separating mixtures of metal chips from oil, such mixtures being produced for example by lathe and/or other machine tool operations. An example of such a machine is disclosed in U.S. Pat. No. 4,137,176, assigned to the same assignee as is the present disclosure, entitled "Chip Discharge for Continuous Chip Wringer". Another generally similar separator is shown in the U.S. Pat. No. 3,850,814. Such machine provides a rotary separator having upwardly diverging sides with a perforated zone intermediate the upper and lower edges thereof. A mixture of chips and oil fed centrally into said rotor moves upwardly along said walls in response to centrifugal force, the oil moving outwardly to suitable receiving means through the perforated zone and the chips doing likewise to other receiving means over the upper edge of said rotor. To assist in conveying the chips to the receiving means for same, said rotor is preferably supplied with impeller means for drawing a strong stream of air into such centrifuge and driving it outwardly with said chips as at least a partial carrier for same.

Such equipment operates very well and has received good commercial acceptance. However, it often happens that bar ends, finished parts or other large pieces of metal are included in the mixture of chips and oil as same is introduced into the separator. If said pieces of metal are very large, as they often are, same will seriously damage the rotor of the centrifuge and will often do so very quickly. This has posed a dilemma of either (1) inspecting the mixture prior to introducing same into the separator and removing therefrom such large pieces of metal, which procedure is economically impractical, or (2) submitting to frequent shutdowns and often repairing of the centrifuge as a result of such large pieces of metal entering thereinto. This dilemma has inhibited the commercial acceptance of the separator as above described from what might otherwise be possible and previous solutions for same have not been fully satisfactory.

Air classification in the metal chip conveying art is known, particularly prior to a crusher as shown in a publication of National Conveyors Company, Inc., Bulletin C-1-67, entitled "National ChipVeyors for Metal Chip Processing and Oil Reclamation". However, this system is very complicated and expensive and, therefore, has had very limited use in combination with centrifugal separator means. The reason for this is that the potential for severe damage to a crusher is much greater than it is for other components in the chip conveying system.

Accordingly, the objects of the invention include:

1. To provide inexpensive classification means for removing large pieces of metal from a mixture of such pieces of metal, metal chips and liquid prior to the introduction of said metal chips and liquid into means for separating the liquid and metal chips from each other.

2. To provide inexpensive classification means, as aforesaid, which is compatible with a system in which a large quantity of air is caused to enter into the separating means and expelled therefrom as at least a partial carrier for said chips.

3. To provide inexpensive classification means, as aforesaid, which will be relatively simple and can be applied to equipment of an existing design by relatively minor modification thereof.

4. To provide inexpensive classification means, as aforesaid, which will have a high degree of reliability and will maintain said reliability over a long period of time with a minimum of maintenance.

5. To provide inexpensive classification means, as aforesaid, which will not interfere with the proper operation of the means separating the liquid and chips from each other.

SUMMARY OF THE INVENTION

In general, the objects and purposes of the invention are met by providing a chute for feeding the mixture to be separated into separating means and there is provided on the bottom of said chute an opening for permitting large pieces of metal to drop therethrough into receiving means. The air drawn by the separator into same and expelled therefrom as at least a partial carrier for said chips is at least in part drawn through said opening and thereby prevents the chips from dropping therethrough. The air drawn through the opening is caused by a blowerlike device located downstream of the chute to thereby effect the generation of a pressure differential across the opening into the chute.

Other objects and purposes of the invention will be apparent to persons acquainted with apparatus of this general type upon reading the following specification and inspection of the accompanying drawings.

BRIEF DESCRIPTION OF THE DRAWINGS

In the drawings:

FIG. 3 is a sectional view taken on the line III—III of FIG. 2;

FIG. 4 is a sectional view taken on the line IV—IV of FIG. 2;

FIG. 5 is a sectional view taken on the line V—V of FIG. 4;

FIG. 6 is a sectional view taken on the line VI—VI of FIG. 5; and

FIG. 7 is a side elevation of a separator having either a separate primary air mover or an auxiliary air mover operatively cooperating with the air movement generated by the rotor;

FIG. 8 is a view similar to FIG. 7 but with an auxiliary blower arranged adjacent the air classifying opening;

FIG. 9 is a perspective view of the underside of a modified chute and air classifying opening; and FIG. 10 is a view similar to FIG. 7 showing an alternate type fan in the outlet from the separator.

DETAILED DESCRIPTION

Figure 1:
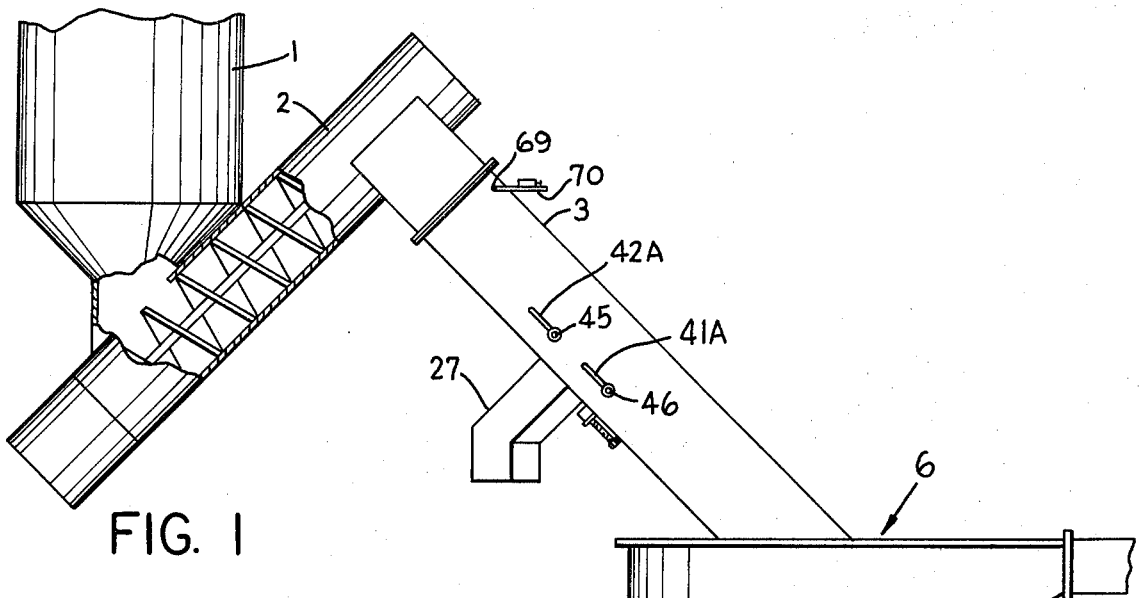
FIG. 1 shows a side elevational, partially broken view of the separator and feeding means for same.
Figure 2:
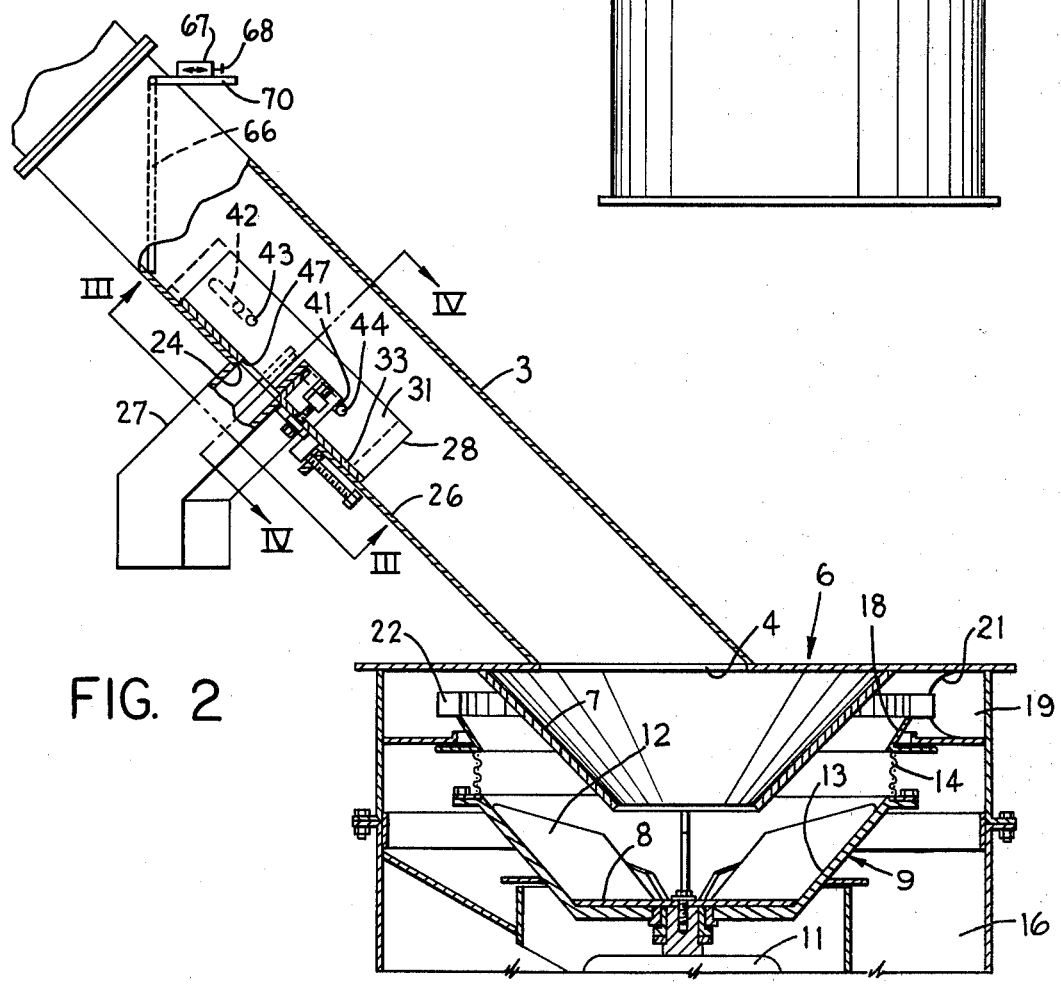
FIG. 2 is a broken view partially in central section showing the separator and that portion of the feeding means incorporating the present invention.

Referring now to the drawings, there will be submitted first a brief description of one form of conventional separator means apparatus in order that the function of the novel apparatus therewith will be better understood. This description, however, will be substantially abbreviated inasmuch as full details thereof may be had upon reference to said above referred to U.S. Pat. No. 4,137,176.

With this understanding, then, attention is directed to said drawings in which a mixture of chips, whatever large pieces of metal may be found therein and a liquid, normally a cutting oil, is received by a hopper 1 and discharged therefrom into a conveyor 2 which carries said mixture to the upper end of and discharges same into a tubular (here rectangularly tubular) feeding chute 3. Said chute then discharges said mixture through the opening 4 of the separator 6. From said opening 4 the mixture drops through a guiding cone 7 to the bottom 8 of the rotor 9 which is driven in any conventional manner by prime mover means such as a motor 11. The mixture is caused to rotate rapidly with said rotor, assisted in the following of said rotor by the radially positioned blades 12, and responds to centrifugal force in a known manner to move upwardly along the interior of the side 13 of said rotor. As the material reaches the screen 14, the oil is separated from the chips and gathered in the annular chamber 16 for discharge through a suitable conduit not illustrated. The chips continue upward, partly in response to the centrifugal force already acquired and partly in response to air drawn through the machine, past said screen 14 to the upper portion 18 of the rotor and are thence flung centrifugally into the annular chamber 19. Said chips are then thrown out of said annular chamber through a tangential exit therefrom, such as the opening 21, and conducted to any desired receiving means. Said conducting will be strongly assisted by the air flow through the machine in response to the rotation of the rotor 6 but may be increased substantially if desired, and as is preferable, by the use of impellers such as the impellers 22 arranged around the perimeter of the upper portion 18.

All of the foregoing is already known, is set forth in detail in U.S. Pat. No. 4,137,176 and is referred to herein only for convenience in reference for a full understanding of the invention.

Turning now to the means comprising the invention, the tubular chute 3 may be horizontally disposed and a conveyor apparatus disposed therein to effect a movement of the material therein or, as illustrated, inclined at an angle, as 45°, to the horizontal and there is provided in the bottom wall 26 thereof either a fixed size or variable size opening 24 which preferably communicates with a suitable conduit 27 for conducting the large piece of metal to appropriate receiving means. If the opening 24 is variable in size, fitting within said chute is a slidable liner 28 having sides 31 and 32 and a bottom 33. Said liner bottom fits closely against the bottom 26 of the chute and the sides 31 and 32 fit snugly against the adjacent sides of the chute. Said liner bottom 33 carries a downwardly projecting tab 34 which extends through a slot 36 (FIG. 3) in the bottom 26 of the chute.

Guide slots 41, 41A and 42, 42A are provided in the respective sides of the chute for the reception of the appropriate guide pins 43 and 44, 45 and 46 as shown. An opening 47 is provided in the bottom of said liner 28 for completing communication between the chute and the conduit 27 when said liner is in appropriate adjusted position. Preferably, as best shown in FIG. 3, both the opening 24 in the bottom of the chute and the opening 47 in the bottom of the liner define a parallelogram whose sides transverse of the chute are preferably at a small angle therewith. This angular positioning of said sides is not essential but if utilized will improve the dropping of a large piece of metal therethrough.

A tab 37 extends downwardly from the bottom 26 of the chute parallel with the tab 34 and threadedly receives an adjusting screw 38. Said screw is rotatably received into a suitable opening in the tab 34 and is held therein by a setscrew 39 which enters in a conventional manner into an appropriate groove within said screw. Thus, rotation of the screw will effect movement of said liner 28 longitudinally of the chute and thereby adjust the effective opening between said chute and the conduit 27.

There is also provided and preferably carried on the liner 28 a barrier 51 which acts both to improve the certainty that a large piece of metal will drop from the chute into the conduit 27 and also extends the upward flowing of the airstream from the conduit 27 into the chute 3 and thereby further diminishes any tendency for the chips to escape from the chute into the conduit 27.

Said barrier 51 comprises a lower wall 52 extending upwardly from the bottom 33 of the liner 28 and extending all of the way across the width of said liner. There is further provided a movable section 53 extending across and fixed to said liner. A guide strip 54 also extends across the liner 28 and is turned over at its ends 56 and 57 to embrace, retain and guide the movable section 53. A slot 58 is provided through the guide strip 54 through which there extends from the movable section 53 a tab 59 threadedly receiving the screw 61. Said screw extends through the bottom of the liner 28 and is rotatably held with respect thereto in any conventional manner, such as by a setscrew 62 extending through a ferrule 63 fixed to the bottom 33 and into an appropriate peripheral groove in said screw 61. Thus, rotation of the screw 61 will cause the movable section 53 to move upwardly and downwardly with respect to said liner 28.

A pivotal gate 66 is secured to the tubular chute 3 on the inside thereof upstream from the opening 24. A movable weight 67 is mounted on an externally accessible arm 70 and the position thereof can be adjusted by any convenient means as by a knob 68 for movement toward and away from the pivot axle 69 to thereby control effective weight of the gate.

OPERATION

While the operation of the apparatus comprising the invention has been somewhat indicated above, same will be reviewed fully to insure a complete understanding of the invention.

The operation of the basic apparatus consisting of the hopper 1, conveyor 2, chute 3 and separator 6 has been set forth briefly above and is set forth fully in U.S. Pat. No. 4,137,176. Hence, no further review of this portion of the apparatus is necessary excepting to emphasize that the operation of the rotor 9, particularly where the impellers 22 are used, creates a strong inflow of air into the separator through the opening 4 and out therefrom through the opening 21. With this in mind and noting that no other means are in this embodiment provided for admitting air into the tubular chute 3, it will be recognized that a very strong flow of air will take place through the conduit 27 and into said chute 3 by way of the openings 24 and 47. Of course, if it should be found in a given instance that it is not possible, or convenient, to draw in through said last-named opening sufficient air to provide the desired chip carrying stream outwardly through the opening 21, it will not depart from the scope of the invention to provide a further air supply at any desired point, such as at any desired point in the chute 3 provided only that such last-named air intake is sufficiently restricted as to insure a strong inflow through the conduit 27 and the openings 24 and 47. The pivotal gate 66 will limit the amount of air entering the chute 3 at the upper end and will facilitate the development of a negative pressure inside the chute. This negative pressure will generally mean that sufficient air is being pulled through the air classification openings 24, 47 to effect a meaningful classification of material. The position of the weight 67 on the arm 70 is adjustable to facilitate a control of the magnitude of the negative pressure in the chute 3 in instances where the size of the opening 47 is normally fixed. That is, the impellers 22 create a very strong flow of air into the chute 3 but effect the development of a negative pressure in the chute. By adjusting the position of the weight 67 on the arm 70, the inflow of air into the chute 3 from the upper end is controlled to thereby regulate the back pressure downstream thereof. It is essential to the invention that there be a pressure drop across the opening from the conduit to the inside of the chute and, particularly, a negative pressure on the inside of the chute 3 if the separator is to centrifuge oil from the chips and simultaneously effect a blowing thereof out the outlet to a designated destination. As a result, an auxiliary blower 71 (FIG. 8) can be provided at the inlet to the conduit 27, for example, to enhance the air classification of components passing the opening 47. A requirement, when the blower 71 is so positioned, is for the pressure in the chute 3 downstream of the opening, particularly at the point of entry of the chute 3 into the separator 6, to be negative so as to assure a proper combined air classification, centrifuging and blowing of chips. On the other hand, a blower 72 (FIG. 7) can be located at the outlet chute 73 with the outlet portion thereof being connected in circuit with the chute 73 and directing an air stream away from the separator to effect a drawing in of air via the Venturi effect through the conduit 27 and opening 47 to facilitate the aforesaid air classification. The blower 72 can, unlike the blower 71 (FIG. 7), be used as the primary generator of air movement in the separator as when the impellers 22 have been omitted or as an auxiliary unit to be used in conjunction with the impellers 22. A centrifugal material handling fan 79 can be used in the outlet 73 if desired and without altering the desired results. The outlet 73 in this instance is connected to the inlet to the centrifugal material handling fan. The gate 66 also will cause the material to be evenly regulated and not be bunched or bundled as they travel through the chute. The gate 66 also will prevent large pieces from bouncing over the opening 47 and into the separator 6.

With the foregoing in mind, we turn now to the adjustment for controlling the size of the opening 24. First, the adjusting screw 38 will be rotated as needed to adjust the size of the opening 47 appropriately to the largest size of bar ends, or other large pieces of metal, which are expected to come through the system. It is, of course, obviously desirable that opening 47 be large enough to permit any such pieces of metal to fall easily therethrough, and do so even though same are in positions other than positions exactly aligned with the sides of said opening, and at the same time it is desirable that said opening be no larger than necessary in order to minimize any tendency for chips to fall therethrough. In other words, having in mind the total amount of air to be drawn into the separator through the chute 3 and any other openings by which air is admitted into said chute 3, the opening 47 should be adjusted first to permit pieces of metal to be separated from the total mixture to fall easily therethrough and second to insure that air flowing therethrough into said chute 3 will be strong enough to keep chips from falling through said opening but not so strong as to inhibit the falling therethrough of said large pieces of metal. Thus, the exact position of said liner and hence of the opening 47 will vary according to the size, shape and weight of the chips and further according to the size, shape and weight of the larger pieces of metal to be separated therefrom but the necessary adjustment can easily be made by operating the single control comprising the adjusting screw 38 until the desired conditions are obtained.

Next the screw 61 will be rotated to raise or lower the barrier 51 as needed further to control the airstream for securing the maximum passage of said chips past the openings 24 and 47 and on down the chute 3 into the separator. Normally the barrier 51 should be as low as possible to facilitate the passage of chips on down the chute with a minimum of turbulence and possible loss of chips at the base of said barrier but such positioning of said barrier must be high enough to insure that the pieces of metal to be separated at this point will be sure to strike said barrier and fall through the openings into the conduit 27. Thus, where said large pieces of metal are bar ends or other relatively large pieces, the barrier 51 will normally be in its lowermost position. However, where such pieces of metal are somewhat smaller and have at least a little capacity to follow the airstream down the chute 3, then said barrier will be higher.

With the above adjustments properly made, a mixture of material comprising chips, larger pieces of metal and a liquid, such as a cutting oil, will be placed in the hopper 1 and the conveyor 2 and rotor 9 started. The conveyor 2 will convey the mixture to the chute. At the same time operation of the rotor will start drawing a strong stream of air into the chute 3 through the conduit 27 and the openings 24 and 47. As the mixture approaches said openings, air entering the chute through said openings will pick up and carry any chips not already entrained in an airstream, as in air entering the chute at or near its upper end, and further will insure that chips which are in such an airstream if one exists are carried over the barrier 51 and on into the lower end of the chute 3. Said chips and liquid carried thereon then go into the separator for separating in the usual manner. In the meantime, any heavier pieces of metal contained within said mixture will upon reaching said opening drop therethrough and through the opening 24 into the conduit 27 for appropriate disposition.

It has been stated above that the chute 3 is positioned at a substantial, as 45°, angle to the horizontal. It will be evident in view of the foregoing description of operation that, stated more precisely, said conduit should be positioned at such an angle to the horizontal as to enable said large pieces to fall by gravity out through the openings 24 and 47 while still permitting the mass of material at least in the upper end of said chute to slide downwardly by gravity. Thus, the angle of said chute 3 to the horizontal should be between about 40° and about 50°, inasmuch as a steeper angle will make it more difficult to effect the dropping by gravity of the large chunks out from said openings and a much shallower angle will inhibit the sliding of at least said large pieces from the entrance to the chute 3 down to said openings. It is conceivable, however, that where for other reasons such greater or lesser angles are desirable, the sliding of the material down the chute to said openings can be assisted in the case of lesser angles by vibration thereof and in the case of relatively steep angles the presence of the barrier 51, with vibration if needed, can be utilized for catching the large pieces of metal and insuring their travel to the conduit 26.

If an auxiliary port for inflow of air into the tubular chute 3 is provided, such as a suitable opening at the upper end of the conveyor 2 or a port somewhere between the opening 24 and the upper end of the chute, it will normally be made of adjustable size in order that the flow of air entering into the chute through the conduit 27 and openings 24 and 47 may still be properly selected and controlled for optimum results.

While the embodiment above described for illustrative purposes assumes that a sufficiently strong stream of air will be drawn through the conduit 27 and the openings 24 and 47 by the suction of the centrifuge, it is clearly within the scope of at least the broader aspects of the invention to provide in addition to such suction any suitable positive pressure means, such as a blower discharging into said conduit 27 and through said openings 24 and 47. This may be desirable where the chips are particularly large and/or heavy. In such case, the upper end of both the chute 3 and the conveyor 2 will be closed and the material in the screw of conveyor 2 will be relied upon as a plug to prevent outflow of air therethrough.

When the size of the opening 47 is fixed, the chute 3 is modified slightly as shown in FIG. 9. More specifically, the chute 3 converges toward the end connected to the separator and the opening 47 has a trapezoidal shape. In this embodiment, the total amount of air to be drawn into the separator through the chute 3 is controlled by the gate 66 adjusted in the manner described above to permit pieces of metal to be separated from the total mixture to fall easily therethrough and to insure that air flowing therethrough into said chute will be strong enough to keep chips from falling through the opening but not so strong as to inhibit the falling therethrough of large pieces of metal. A platelike barrier 74 similar to the barrier 51 is provided to control the airstream for securing the maximum passage of the chips past the opening 47 and on along the chute 3 into the separator. The height of the barrier 74 is adjustable by means of a stud 76 being weldably secured to the plate 74 and received in an elongated slot 77 in the base of a U-shaped trough 78 and locked into place by a nut.

It will be recognized that while a particular separator has been utilized herein to illustrate the invention, the invention will be applicable to other forms of separators provided only they can generate a substantial air flow thereinto.

In view of the foregoing, it will be recognized that this apparatus has a wide range of adjustability to accommodate itself to a wide range of operating conditions including a wide range of sizes, weights and shapes in the materials to be separated and hence will have a wide range of useful applications.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a system for recovering the cutting tool liquid from a mixture of heavy, high mass density components, machine turnings, cutting chips and cutting tool liquids, said system including a negative air pressure generating centrifugal separator means for extracting liquids from the machine turnings and cutting chips, means for separating the heavy components prior to entry of the mixture into said centrifugal separator means, said means comprising: a feed conduit communicating with an inlet opening in said centrifugal separator means and being the only inlet opening communicating with the interior thereof, said conduit having a bottom wall, means limiting the quantity of air entering said feed conduit at its intake end whereby said centrifugal separator means maintains a negative air pressure throughout said conduit; an opening in said bottom wall of said conduit providing an intake of air at a higher pressure than that in said conduit creating an entering column of air at a velocity sufficient to entrain said machine turnings, cutting chips and the cutting tool liquids while permitting said heavy components to drop through said opening, said means limiting the quantity of air entering said feed conduit also effecting a major portion of said air to enter said conduit through said opening.

2. The system of claim 1, wherein said centrifugal separator means is also utilized for the blowing of said machine turnings, cutting chips without said cutting tool liquids out of an outlet of said centrifugal separator means to a designated location.

3. The system of claim 1, wherein said means for limiting said quantity of air entering said feed conduit includes a movable gate adjacent said intake end thereof upstream from said opening, said gate controlling the amount of air entering said feed conduit through said intake end.

4. The system of claim 3, wherein said gate is a vane, a hinge member pivotally supporting said vane, and an element biasing said vane to close said intake end of said feed conduit.

5. The system of claim 1, wherein said centrifugal separator means includes a rotatably driven rotor, said negative air pressure being generated by impeller means mounted on said rotor.

6. The system of claim 5, wherein said rotor is bowl shaped and wherein said impeller means is mounted adjacent the rim of said bowl.

7. The system of claim 6, wherein said centrifugal separator means includes an auxiliary blower mounted adjacent said opening in said bottom wall of said feed conduit and directing an air stream into said opening.

8. The system of claim 1 or claim 5, wherein said centrifugal separator means includes a centrifugal separator having an outlet and further includes a blower mounted adjacent said outlet and directing an air stream into said outlet away from said centrifugal separator.

9. The system of claim 8, wherein said blower is a centrifugal material handling fan mounted in said outlet.

10. The system of claim 8, wherein said blower effects via the Venturi effect the inflow of air into said opening.

11. The system of claim 1, wherein said feed conduit is inclined at an angle to the horizontal, said mixture sliding along said bottom wall under the effect of gravity.

12. The system of claim 11, wherein said angle is between about 40° and about 50°.

13. The system of claim 1, including plate means movable along said bottom wall of said feed conduit for adjusting the size of said opening and means for effecting movement of said plate relative to said feed conduit.

14. The system of claim 13, wherein said last-named means are manual.

15. The system of claim 1, including a barrier positioned substantially perpendicularly with respect to said bottom wall of said feed conduit, located adjacent the downstream edge of said opening and extending from said bottom wall of said feed conduit partway across said feed conduit, whereby to cause air flowing into said feed conduit through said opening to move generally toward the center of said feed conduit and thereby to deflect away from said opening and over said barrier said machine turnings, cutting chips and said cutting tool liquids while permitting said heavy components to fall through said opening.

16. The system of claim 15, wherein said barrier is adjustable for selecting the distance it extends away from said bottom wall of said feed conduit.

17. The system of claim 15, wherein said barrier is mounted on said plate.

18. The system of claim 1, wherein said opening is of generally parallelogram shape with the long sides of said parallelogram extending transversely of said feed conduit and being at an angle with respect to the sides of said feed conduit.

19. The system of claim 1, wherein said opening communicates with air at atmospheric pressure.

20. The system of claim 1, wherein said feed conduit includes a mechanical conveyor means for effecting a delivery of said mixture to said intake end thereof.

21. The system of claim 1, wherein mechanical conveyor means is provided for effecting a delivery of said mixture to said intake end of said conduit.

22. The system of claim 1, wherein said inlet opening in said centrifugal separator means is in the top thereof, and wherein said feed conduit is inclined downwardly toward said centrifugal separator means at no more than a minor angle.

23. The system of claim 1, wherein said feed conduit includes means for effecting a movement of said mixture from said intake each directly toward said outlet end while in engagement with said bottom wall.

* * * * *